July 8, 1969  R. A. HANMER  3,453,814
HELIX FEEDER FOR LAWNMOWER
Filed Aug. 24, 1966

3,453,814
HELIX FEEDER FOR LAWNMOWER
Richard Alan Hanmer, Sedona, Ariz., assignor to The Lazy Eight (∞), Inc., Cambridge, Mass., a corporation of Massachusetts
Filed Aug. 24, 1966, Ser. No. 574,711
Int. Cl. A01d 55/20, 53/04, 57/02
U.S. Cl. 56—249                                 13 Claims

ABSTRACT OF THE DISCLOSURE

Feeder apparatus for lawnmowers including a smooth surfaced helix having a helix angle of 30° to 60° arranged for mounting forward of the cutter with the longitudinal axis of the helix parallel to the ground and transverse to the direction of advance of the mower and a drive for rotating the helix about its longitudinal axis.

---

This invention relates to helix feeders for lawnmowers and to mowers provided with such feeders.

The inability to effectually cut long stems and high grass has been a major shortcoming of conventional lawnmowers. Attempts to improve this ability by the use of feeding mechanisms that gathered the difficult vegetation and fed them to the mower blades have not been entirely satisfactory. Many such devices have teeth, roughened surfaces, or other means designed to enmesh and frictionally engage the vegetation. These devices often entangle the vegetation so that it is torn or uprooted instead of being cut. All of them are complex either to manufacture or in assembly with the lawnmowers or both. Additionally, the problem of placing low lying grass in position for cutting has not heretofore been effectively dealt with.

It is therefore an object of this invention to provide a feeder adapted to be mounted on lawnmowers and to provide a lawnmower in combination with a feeder which will enable the lawnmower to cut vegetation normally missed and which will effect a more even and more complete cut than normal lawnmowers.

A further object of this invention is to provide a feeder adapted to be mounted on a lawnmower and to provide a lawnmower in combination with a feeder which will fold over very tall stems so that they may be received by the lawnmower, which will toss the tops of stems into the lawnmower, and which will set up traveling waves in low lying grass that will tend to raise the grass making it accessible to the lawnmower.

A further object of this invention is to provide a feeder adapted to be mounted on a lawnmower which aids the cutting of vegetation, protects animals and humans from coming in contact with the blades and which protects the blades from coming in contact with sticks, stones, bones, or other damaging objects.

A further object of this invention is to provide a feeder which is extremely simple, inexpensive, rugged, and easily adapted to conventional type lawnmowers.

The invention features a smooth surfaced helix adapted to be rotatably mounted in front of a lawnmower, with its longitudinal axis transverse to the direction of advancement of the lawnmower, and parallel to the ground. Drive means are connected to the helix for rotating it about its longitudinal axis.

In embodiments wherein the lawnmower is of the rotary reel type, the drive means for the helix is coupled to the drive means for the reel, and the drive means for the helix affords a reduction ratio enabling the helix to rotate at a speed at which the lineal speed of the lower periphery of the helix moving toward the blades is approximately five times the speed of advancement of the lawnmower.

Other objects, features, and advantages will appear from the following description of a preferred embodiment of the invention, taken together with the following drawings, in which.

Figure 1:
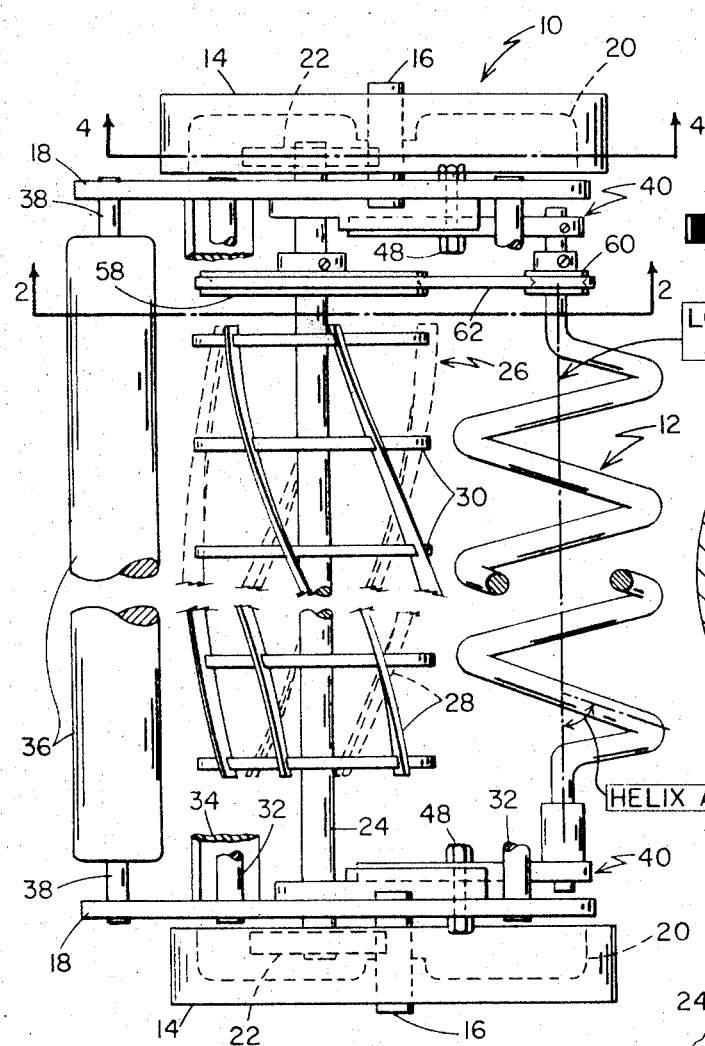
FIG. 1 is a top view of a reel type lawnmower with the helix of this invention.

There is shown in FIG. 1 a reel type lawnmower 10 having a helix 12 attached at its forward end. Helix 12 is a metal wire formed as a helix and is of sufficient thickness to maintain the helical shape during use.

While the helix herein described has a circular cross-section, any cross-section will suffice. However, the surface of the member should be smooth and free of snags for effective generating of traveling waves in low lying vegetation and for preventing vegetation from getting caught on the revolving helix, and being torn or uprooted.

Figure 4:
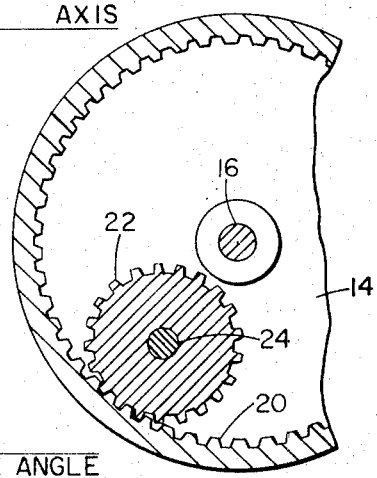
FIG. 4 is a sectional view taken along line 4—4 of FIG. 1.

Ground wheels 14 are rotatable on axles 16 which are mounted in side frames 18. Internal gears 20, formed on the inner periphery of wheels 14, engage planetary gears 22 on either end of shaft 24, FIG. 4. Shaft 24 is rotatably mounted in side frames 18 and is therein keyed against lateral movement. On shaft 24 is reel 26 consisting of five blades 28 mounted on spaced supports 30; supports 30 are mounted on shaft 24.

A uniform, rigid housing is formed by side frames 18, support bars 32 and the cutter bar 34. Cutter bar 34 is set in shearing relationship with blades 28. An after-roller 36 on axles 38 is rotatably mounted in side frames 18.

Figure 3:
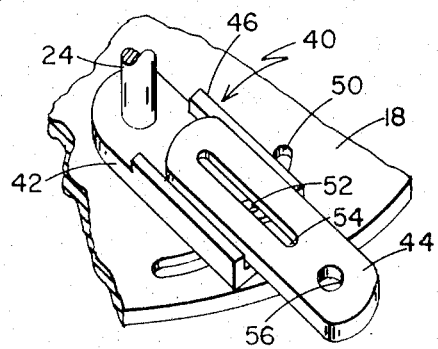
FIG. 3 is an enlarged view of a bracket that supports an end of the helix.

Helix 12 is mounted in adjustable brackets 40, FIG. 3. They consist of member 42 pivoted on shaft 24 and arm 44, slidably mounted between upstanding walls 46 of member 42. Once in proper position, both pivoting member 42 and sliding arm 44 are locked in place by a bolt and nut 48 through an arcuate slot 50 in side frames 18. A hole 52 in pivoting member 42 and slot 54 in sliding arm 44 permit adjustment without removal of bolt and nut 48. The ends of helix 12 are received in bearings 56 in arms 44. Since member 42 is pivoted about the axis of reel 26, angular movement of member 42 to vertically adjust helix 12 will always move helix 12 in paths concentric to the circumference of reel 26. Arm 44 adjusts the radial distance between helix 12 and reel 26.

Pulley 58 on shaft 24 drives pulley 60 on helix 12 by means of a belt 62. The ratio of the circumferences of pulleys 58 and 60 are such that helix 12 will rotate at approximately four times the speed of reel 26. Although the relative rotational speeds of helix 12 and reel 26 are important, the lineal speed of a point on the periphery of the helix per foot of advancement of the lawnmower is also relevant to the ability of the helix to feed vegetation to the mower.

In conventional reel type lawnmowers where the reel rotates at 1½ to 3 revolutions per foot of advance, generally 2 rev. per foot of advance, the helix will operate at speeds from 6 to 12 revolutions per foot of advance. With a 2½ inch diameter helix operating at a preferred speed of 8 revolutions per foot of advance of the lawnmower, a point on the lower periphery of the helix will move backward, toward the blades, at a speed of approximately 5.2 feet per foot of advance of the lawnmower. The ratio of pulleys 58 and 60 should be adjusted in each case so that the lineal speed of a point on the periphery of the helix is approximately five times the speed of advancement of the lawnmower. At this speed a blade of grass in the helix will be moved a distance of two feet along the helix, i.e. transverse to the direction of movement of the lawnmower, for every one foot of advance of the lawnmower.

Either or both pulleys 58 and 60 may be of the adjustable type. One adjustable pulley structure is composed of two discs having tapering inner walls that increase in thickness towards the axis of the pulleys. By moving the two discs together, the belt is driven outward from the pulley axis increasing the effective circumference of the pulley. Moving the discs apart allows the belt to move toward the axis of the pulley, decreasing the effective circumference of the pulley. A pulley and belt drive is preferred over a gear or other positive drive for its ability to slip if the helix should become jammed. It is within the scope of the inventive concept to have the helix driven by a power source such as used in rotary blade or tractor-hauled scissor mowers, or to use a power source separate from that which drives the cutting mechanism.

Helix 12 may be of any size; helices having diameters of from one to six inches have been used; those of approximately two and one-half inches in diameter are preferred.

Regardless of the size of the helix, optimum settings place the lower periphery of the helix as close to the ground as possible without causing jamming, and the upper periphery not substantially higher than the axis of the reel; the helix should be as close to the reel as possible allowing sufficient clearance to tolerate minor deformation which may take place upon engagement of the helix with vegetation or obstructions.

The helix may be longer or shorter than the reel without departing from the scope of the invention.

Figure 2:
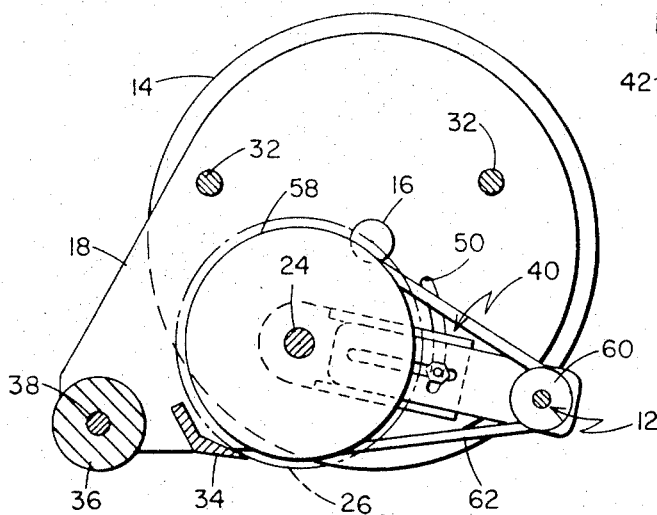
FIG. 2 is a sectional view taken along line 2—2 of FIG. 1.

The angle of the helix to its longitudinal axis is the helix angle and should be from 30° to 60°; good results have been obtained with a helix angle of 45°. It should be appreciated that the helix may be the same "hand" as the blades on the reel, or the opposite, without losing its effectiveness. In FIG. 1 both the reel and the helix are pictured as right-handed. That is, in FIG. 1 the blades closest to the observer both extend from the lower left to the upper right of the drawing. Both reel 26 and helix 12 rotate in the clockwise direction as viewed in FIG. 2.

In operation the helix feeds the mower in three ways: by folding, by tossing, and by generating traveling waves in the vegetation. It folds by passing successive increments of a tall stem, laterally, across the helix, generally transverse to the direction of travel of the lawnmower. This action results from the screw action of a rotating helix. It tosses by trapping the tops of stems in the angles of the helix and tossing them backward as the entrapping angle moves beneath the helix axis and upward proximate the reel. It makes low lying grass and vegetation accessible by generating traveling waves in the grass which cause it to ripple even after it has lost contact with the helix. The crest of such waves brings the grass within reach of the mower.

It is apparent that the feeder of this invention will prepare any vegetation for cutting, and may be used with rotary blade, shearing, or other types of mowing devices, as well as the rotary reel type.

Other embodiments will occur to those skilled in the art and are within the following claims.

What is claimed is:

1. Feeder apparatus for lawnmowers comprising:
   a smooth surfaced helical member having a helix angle from 30° to 60°, adapted to be mounted forward of the cutting mechanism of the lawnmower with its longitudinal axis arranged transversely to the direction of advance of the lawnmower and parallel to the ground,
   mounting means adapted to be connected to said lawnmower for rotatably supporting said helical member, and
   drive means connected to said helical member for rotating said helical member about its longitudinal axis.

2. The apparatus of claim 1 in which said cutting mechanism includes a plurality of blades mounted on a rotary reel, a cutting bar in shearing relation with said blades, in which said lawnmower includes second drive means for rotating said reel, and in which said drive means for rotating said helical member is driven from said second drive means.

3. The apparatus of claim 2 in which said drive means includes a driving member and a driven member for imparting a lineal speed to the periphery of said helical member which is approximately five times the speed of advancement of said lawnmower, said driving member being driven from said second drive means and said driven member being connected to said helical member.

4. The apparatus of claim 3 in which said drive means includes means for varying the ratio of said driving and driven members for optimizing the lineal speed of the periphery of said helical member with respect to the speed of advancement of said lawnmower.

5. The apparatus of claim 3 in which said mounting means includes a first adjusting member pivoted about the axis of said reel for adjusting the vertical position of said helical member about the circumference of said reel, and a second adjusting member slidable on said first adjusting member for adjusting the radial distance of said helical member from said reel.

6. The apparatus of claim 1 in which said helical member has a diameter in the range of one to six inches.

7. The apparatus of claim 1 in which the helix angle of said helical member is in the range of thirty to sixty degrees.

8. In combination, a lawnmower and a smooth surfaced helical member having a helix angle from 30° to 60°,
   said lawnmower including a rotating reel, a plurality of blades mounted on said reel, a cutting bar in shearing relation with said blades, first drive means for rotating said reel, and second drive means, driven from said first drive means, for rotating said helical member, and
   said helical member being rotatably supported in mounting means in front of said reel and said cutter bar, and having its longitudinal axis transverse to the direction of travel of said lawnmower and parallel to the ground.

9. The combination of claim 8 in which said second drive means includes a driven member and a driving member for adjusting the lineal speed of the periphery of said helical member, said driven member being connected with said helical member and said driving member being connected with said first drive means.

10. The combination of claim 9 in which said helical member is 2½ inches in diameter and has a helix angle of 45°, said reel is rotating at approximately 2 revolutions per foot of advance of the lawnmower, and said driven member and said driving member are in a 4:1 ratio and are rotating said helix at a speed of approximately 8 revolutions per foot of advancement of the lawnmower.

11. The combination of claim 8 in which said mounting means includes a first adjusting member pivoted about the axis of said reel for adjusting the vertical position of said helical member about the circumference of said reel, and a second adjusting member slidable on said first adjusting member for adjusting the radial distance of said helical member from said reel.

12. The combination of claim 8 in which said helical member has a diameter in the range of 1 to 6 inches.

13. The combination of claim 8 in which the helix angle of said helical member is in the range of 30° to 60°.

References Cited

UNITED STATES PATENTS

| | | | |
|---|---|---|---|
| 2,164,467 | 7/1939 | Mulno | 56—238 |
| 2,299,384 | 10/1942 | Day | 56—249 |
| 2,630,668 | 3/1953 | McDermott | 56—238 |

FOREIGN PATENTS 136,007   1/1950   Australia.

ANTONIO F. GUIDA, *Primary Examiner.*

U.S. Cl. X.R.

56—238